(12) United States Patent
Baylot et al.

(10) Patent No.: US 10,024,461 B2
(45) Date of Patent: *Jul. 17, 2018

(54) SYSTEM AND METHOD FOR HANDLING REELS FOR LAYING ELONGATED MEMBERS ON THE BED OF A BODY OF WATER, AUXILIARY STRUCTURE, AND LAYING VESSEL

(71) Applicant: SAIPEM S.p.A., San Donato Milanese (IT)

(72) Inventors: Michel Baylot, Marghera (IT); Yann Hajeri, Treviso (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,927

(22) Filed: Jan. 24, 2017

(65) Prior Publication Data

US 2017/0159848 A1 Jun. 8, 2017

Related U.S. Application Data

(63) Continuation of application No. 14/646,664, filed as application No. PCT/IB2013/060522 on Nov. 29, 2013, now Pat. No. 9,567,043.

(30) Foreign Application Priority Data

Nov. 30, 2012 (IT) .............................. MI2012A2049

(51) Int. Cl.
*F16L 1/12* (2006.01)
*B63B 35/03* (2006.01)
(Continued)

(52) U.S. Cl.
CPC .............. *F16L 1/207* (2013.01); *B63B 35/03* (2013.01); *B63B 35/04* (2013.01); *F16L 1/12* (2013.01); *F16L 1/203* (2013.01); *F16L 1/205* (2013.01)

(58) Field of Classification Search
CPC .......... F16L 1/203; F16L 1/205; B63B 35/03; B63B 35/04
(Continued)

(56) References Cited

U.S. PATENT DOCUMENTS 3,591,023 A 7/1971 Allen
4,117,692 A 10/1978 Oberg
(Continued)

FOREIGN PATENT DOCUMENTS

CN 102020003 4/2011
EP 0 302 038 2/1989
(Continued)

OTHER PUBLICATIONS

International Search Report and Written Opinion for International Application No. PCT/IB2013/060522 dated Jul. 25, 2014.
(Continued)

*Primary Examiner* — Frederick L Lagman
(74) *Attorney, Agent, or Firm* — Neal, Gerber & Eisenberg LLP

(57) ABSTRACT

A system configured to handle reels for laying elongated members on the bed of a body of water, and in particular for transferring reels between an auxiliary structure and a laying vessel, has a bridge configured to connect the auxiliary structure and the laying vessel; and actuators configured to move a reel along and resting on the bridge.

4 Claims, 13 Drawing Sheets

(51) Int. Cl.
*B63B 35/04* (2006.01)
*F16L 1/20* (2006.01)

(58) Field of Classification Search
USPC .................................................... 405/168.3
See application file for complete search history.

(56) References Cited

U.S. PATENT DOCUMENTS

| | | | |
|---|---|---|---|
| 4,260,287 A | 4/1981 | Uyeda | |
| 4,269,540 A * | 5/1981 | Uyeda | B63B 35/03 226/172 |
| 4,274,799 A | 6/1981 | Tisdale, III | |
| 4,480,757 A | 11/1984 | Oustad | |
| 4,913,080 A | 4/1990 | Kindem | |
| 7,341,422 B1 | 3/2008 | McCown | |
| 7,544,013 B2 | 6/2009 | Hoffmann et al. | |
| 7,927,040 B2 | 4/2011 | Wilson | |
| 9,567,043 B2 * | 2/2017 | Baylot | B63B 27/30 |
| 2003/0019412 A1 | 1/2003 | Langh | |
| 2005/0006516 A1 * | 1/2005 | Li | B65H 75/42 242/377 |
| 2005/0281620 A1 | 12/2005 | Hoffmann | |
| 2011/0170988 A1 | 7/2011 | Perry et al. | |
| 2011/0217124 A1 | 9/2011 | Taylor, Jr. | |
| 2011/0274518 A1 | 11/2011 | Pose | |
| 2012/0020739 A1 * | 1/2012 | Lyngberg | F16L 1/18 405/166 |
| 2012/0061504 A1 * | 3/2012 | Powell | B65H 49/24 242/564 |
| 2012/0148348 A1 * | 6/2012 | Stockstill | B23K 37/047 405/170 |
| 2013/0051920 A1 | 2/2013 | Roodenburg | |
| 2013/0087650 A1 * | 4/2013 | Screaton | B65H 49/32 242/559.2 |
| 2013/0251456 A1 * | 9/2013 | Haugen | F16L 1/16 405/166 |
| 2015/0139736 A1 * | 5/2015 | Ardavanis | B63B 35/03 405/166 |

FOREIGN PATENT DOCUMENTS

| | | |
|---|---|---|
| EP | 2 591 992 | 5/2013 |
| FR | 2120495 | 8/1972 |
| FR | 2268686 | 11/1975 |
| WO | WO 2009/077711 | 6/2009 |
| WO | WO 2011/105894 | 9/2011 |
| WO | WO 2013/006041 | 1/2013 |

OTHER PUBLICATIONS

PCT Demand (Form PCT/IPEA/401) for International Application No. PCT/IB2013/060522 and Reply dated Oct. 27, 2014.
Second Written Opinion of the International Preliminary Examining Authority for International Application No. PCT/IB2013/060522 dated Dec. 8, 2014.
Second Reply to the Written Opinion for International Application No. PCT/IB2013/060522 dated Feb. 3, 2015.
Partial European Search Report for EP Application No. 16187172.8 dated Mar. 16, 2017.

* cited by examiner

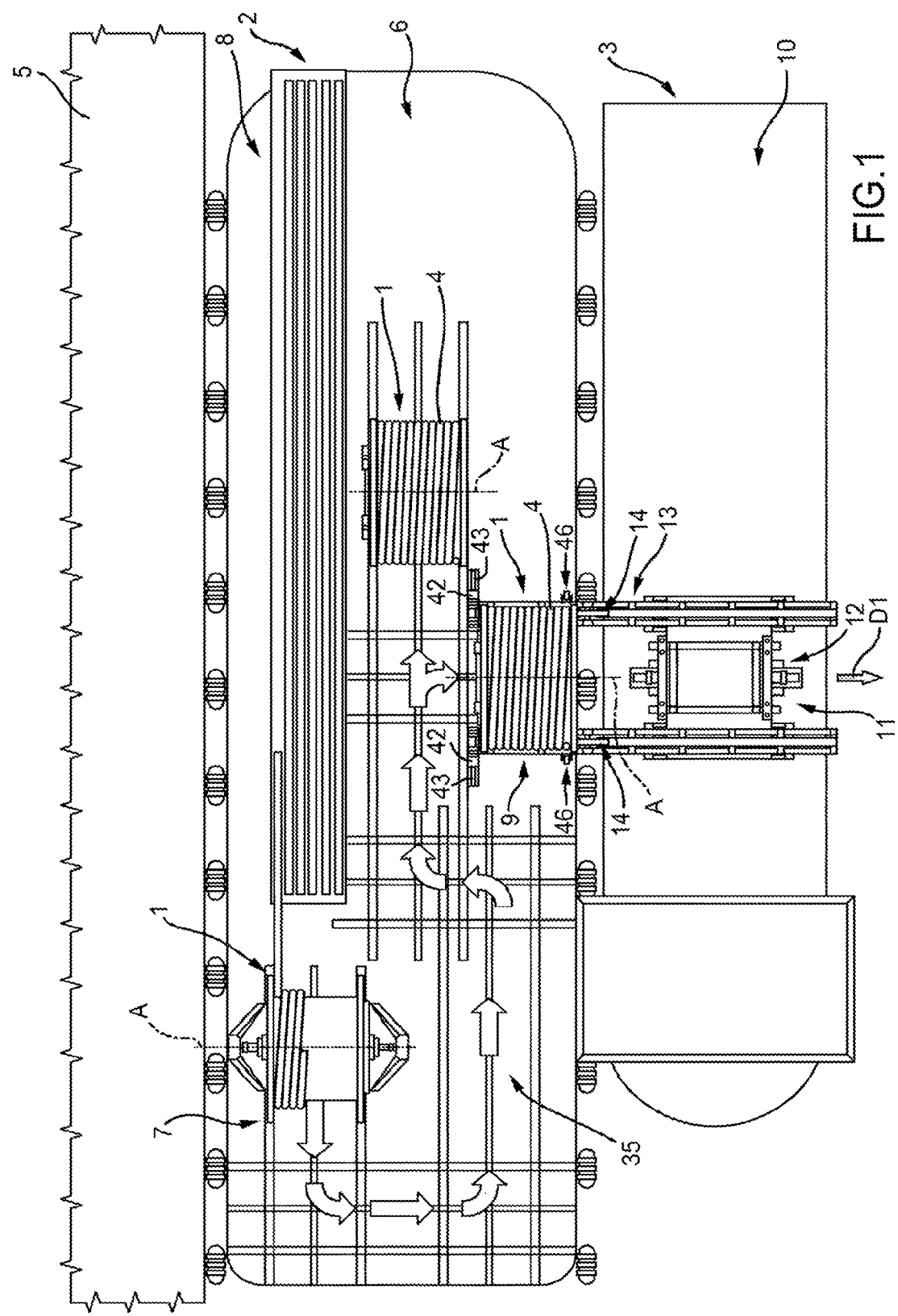

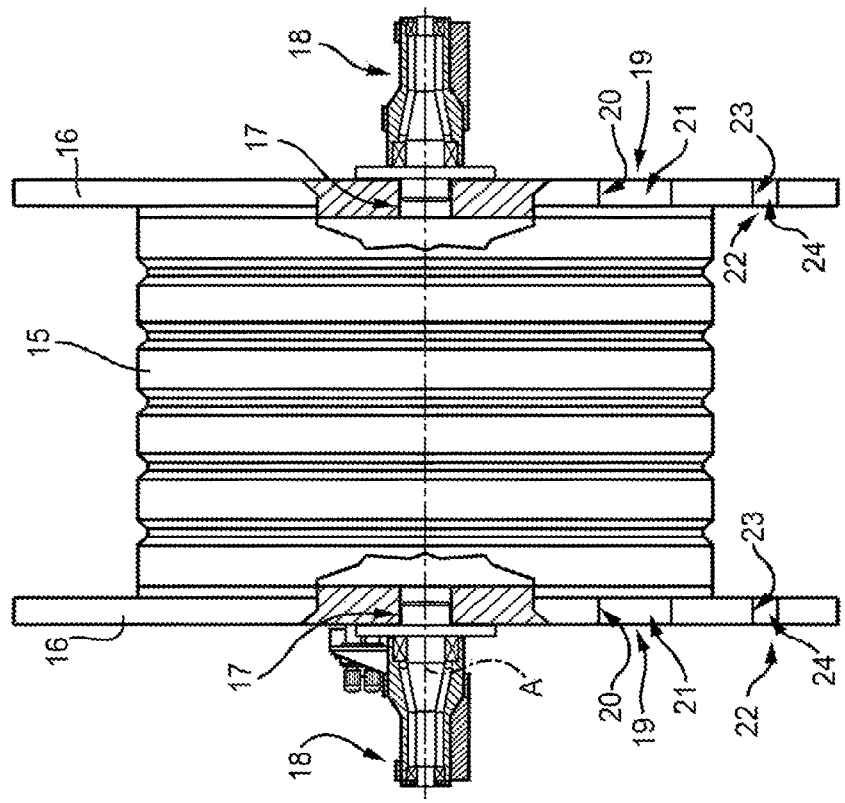
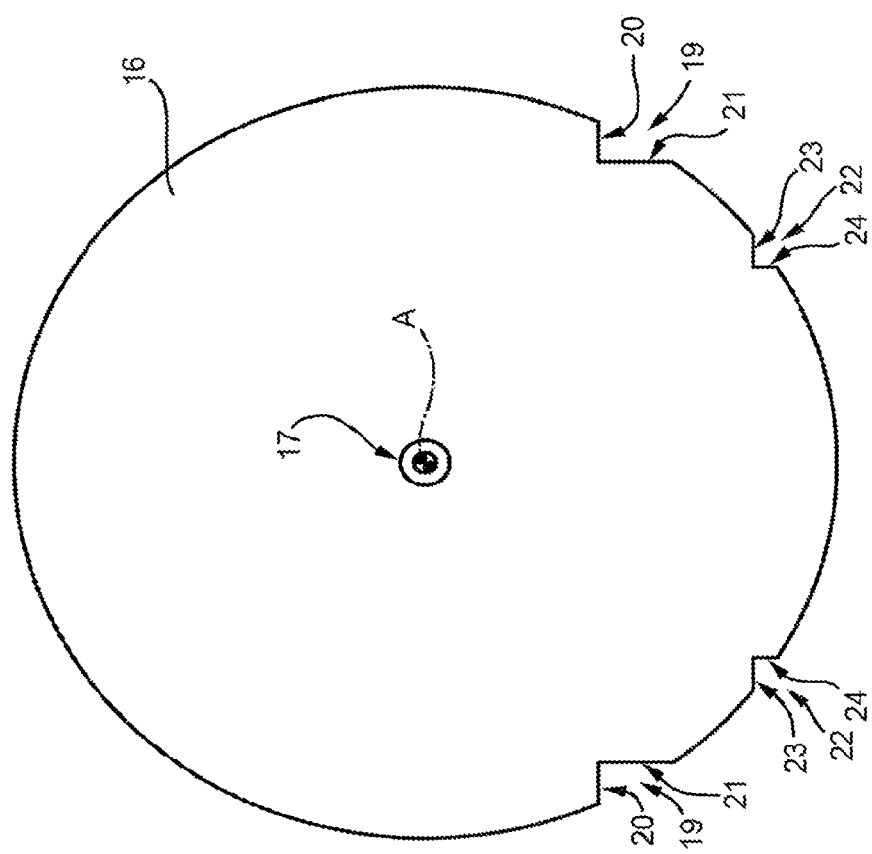

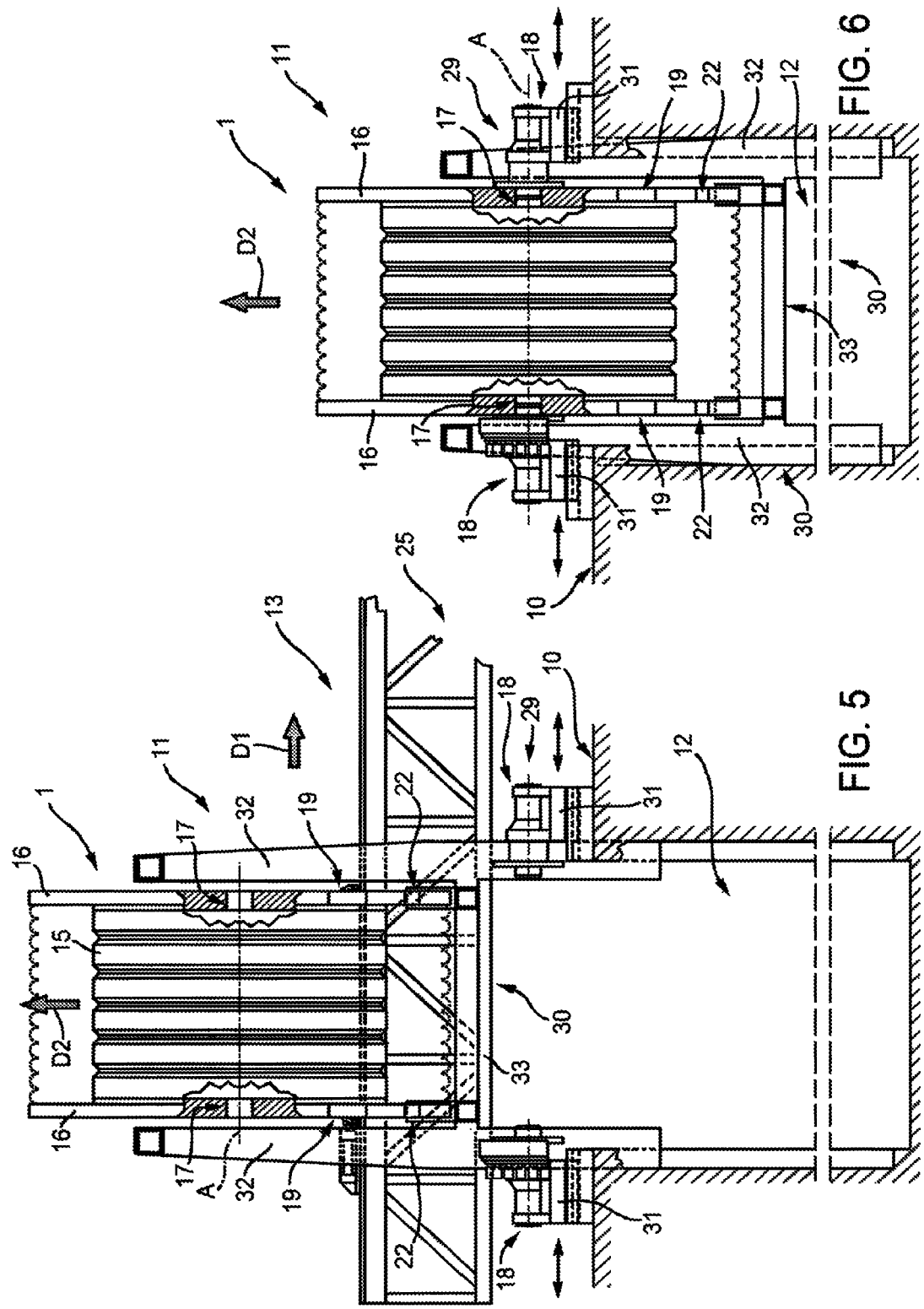

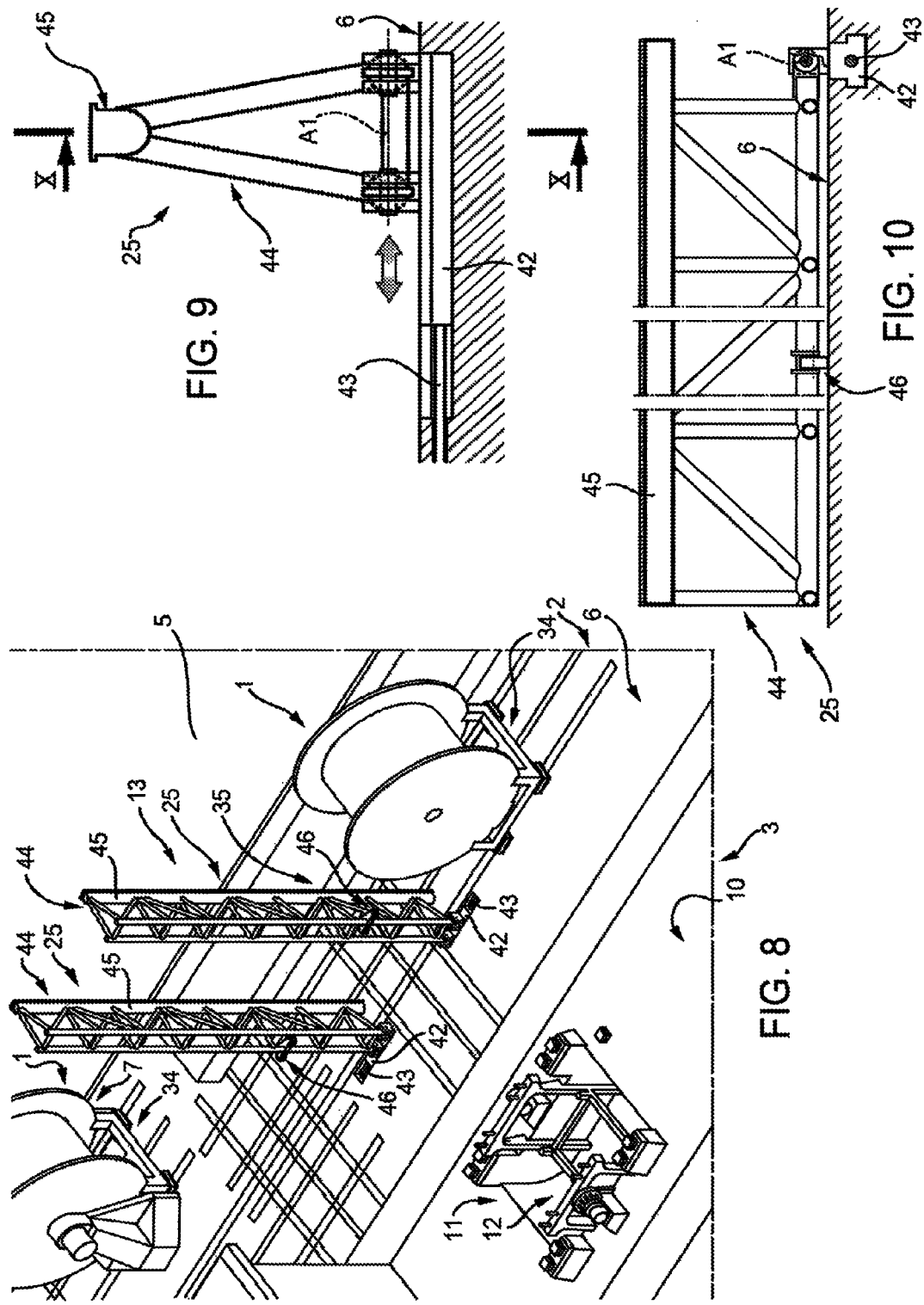

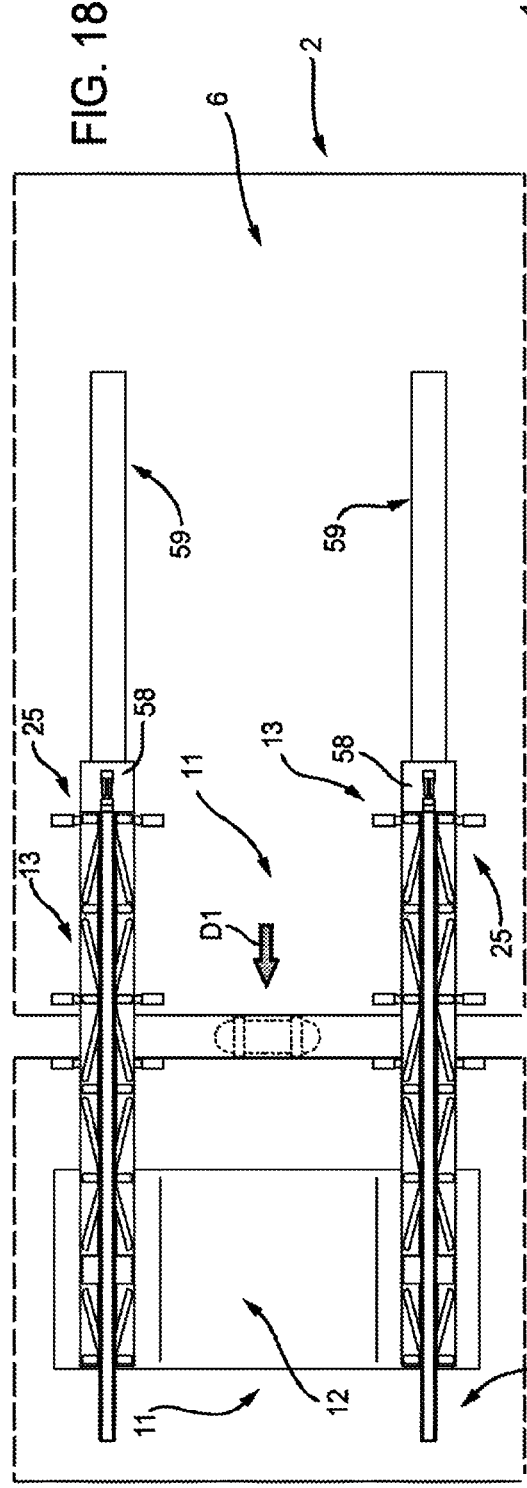
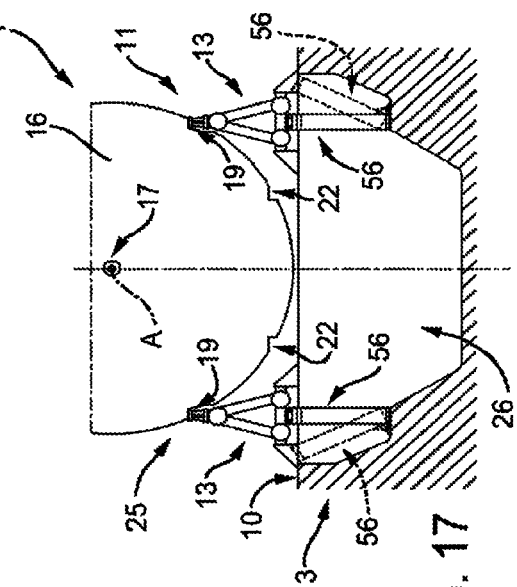
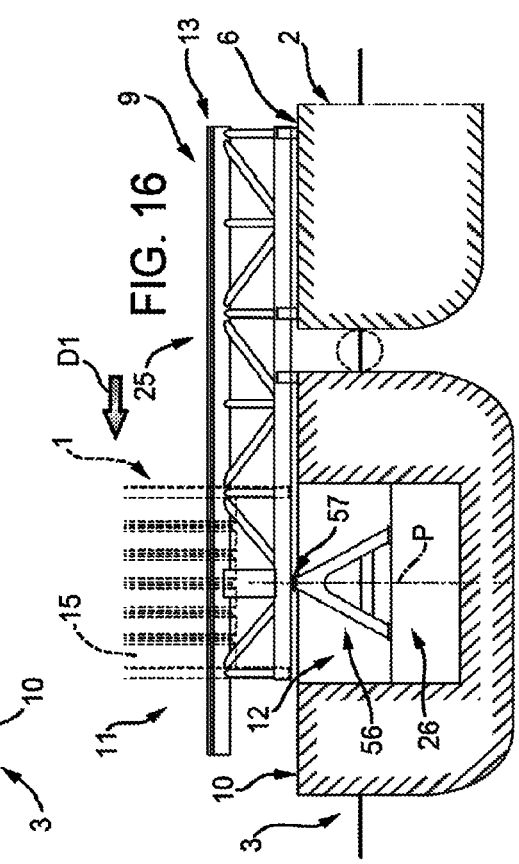

SYSTEM AND METHOD FOR HANDLING REELS FOR LAYING ELONGATED MEMBERS ON THE BED OF A BODY OF WATER, AUXILIARY STRUCTURE, AND LAYING VESSEL

PRIORITY CLAIM

This application is a continuation of, claims the benefit of and priority to U.S. patent application Ser. No. 14/646,664, filed on May 21, 2015, now U.S. Pat. No. 9,567,043, which is a national stage application of PCT/IB2013/060522, filed on Nov. 29, 2013, which claims the benefit of and priority to Italian Patent Application No. MI2012A 002049, filed on Nov. 30, 2012, the entire contents of which are each incorporated by reference herein.

BACKGROUND

The present disclosure relates in general to the laying of elongated members on the bed of a body of water using a laying vessel. The elongated members, in this case underwater pipelines or cables, are composed of strings, each of which is wound on a reel, and is unwound gradually off the reel, from an unreeling station on board a laying vessel, and laid on the bed of the body of water as the laying vessel moves forward. One of the most critical aspects of this laying technique is feeding the strings to the laying vessel once the reel is unwound.

When the reel is mounted in a fixed position on the laying vessel and the string is reeled off completely, the laying vessel returns to the quay to wind the reel with another string of the elongated member. The string is prefabricated at the quay and simultaneously wound onto the reel on the laying vessel. This operating method involves relatively considerable and costly downtime of the laying vessel, which remains substantially idle the whole time the string is being prefabricated.

To reduce downtime of the laying vessel, U.S. Pat. No. 7,544,013 proposes prefabricating the strings on a floating auxiliary structure; winding the string onto a reel on the floating auxiliary structure; and transferring the string to a reel on the laying vessel, unreeling the string off the reel on the floating auxiliary structure, and simultaneously reeling the string onto the reel on the laying vessel. This method reduces the downtime involved in prefabricating the string, but not the time taken to transfer to string from one reel to another.

An alternative transfer method employs releasable reels that can be detached from the laying vessel, winds the reels in an auxiliary structure, and transfers the reels from the auxiliary structure to the laying vessel.

In line with this operating method, PCT Patent Application No. WO 2011/105894 proposes prefabricating a number of reels; loading the reels onto the laying vessel; and positioning the reels successively at the unreeling station. The wound and unwound reels are loaded and unloaded respectively using cranes, which makes it difficult to position the reels accurately. It should be appreciated that these reels weigh thousands of tons, so handling them is a complex and also hazardous job, especially when they are suspended from a crane. A load suspended from a cable tends to swing, thus making it relatively difficult to position, and also endangering any nearby personnel or structures. Moreover, handling the reels is made even more difficult by the crane being mounted on a floating unit. That is, floating units equipped with cranes are invariably massive, precisely to ensure greater stability of the crane.

EP Patent No. 302,038, PCT Patent Application No. WO2009/077711, U.S. Pat. No. 7,927,040, U.S. Pat. No. 4,117,692, PCT Patent Application No. WO 2011/105894, EP Patent No. 2,591,992, and PCT Patent Application No. WO 2013/006041 describe other technical solutions adopted in this field, but none are fully satisfactory in reducing both downtime of the laying vessel, and endangerment of onboard personnel.

Even documents concerning the transfer of cargos or containers such as U.S. Published Patent Application No. 2011/170,988 French Patent No. 2,268,686, and French Patent No. 2,120,495 from two vessels or from a dock to a vessel do not provide adequate and prompt solutions to the drawbacks of this prior art.

SUMMARY

The present disclosure relates to a system configured to handle reels for laying elongated members on the bed of a body of water.

More specifically, the present disclosure relates to a system configured to transfer such reels between an auxiliary structure and a laying vessel alongside the auxiliary structure.

It is an advantage of the present disclosure to provide a reel handling system configured to eliminate or at least reduce certain of the drawbacks of certain of the known art.

According to the present disclosure, there is provided a system configured to handle reels for laying elongated members on the bed of a body of water, the system comprising an auxiliary structure comprising a transfer station; a laying vessel comprising an unreeling station; at least one bridge configured to connect the auxiliary structure and the laying vessel; and at least one actuator configured to move at least one reel along the bridge between the auxiliary structure and the laying vessel, wherein the guides are movable between a rest position, and a work position, in which they are parallel to each other, with a designated or given gauge, to define the bridge which extends from transfer station to unreeling station where reels are loaded/unloaded onto/off bridge; the reel being configured to rest on the bridge.

By virtue of the present disclosure, the reel is transferred between the auxiliary structure, where the strings can be prefabricated, and the laying vessel without suspending the reel from a crane. This has advantages in terms of transfer precision and, therefore, speed, as well as in terms of personnel safety.

By eliminating the need for a heavy-duty crane, the solution proposed also enables use of relatively small-size vessels. That is, as opposed to being suspended and possibly swinging dangerously from a crane, the reels rest on and travel along precise, controlled paths.

Once the reels are transferred, the guides are set to the rest position to enable the laying vessel and the auxiliary structure to move alongside and later away from each other.

The gauge of the guides is, in certain embodiments, variable between a designated or given position in which they support the reel, and a position in which they do not interfere with the reel.

The guides are, in certain embodiments, mounted on the auxiliary structure in sliding manner.

In one variation, the guides slide in a direction perpendicular to themselves to alter the gauge between them.

In one variation, the guides slide parallel to themselves to set the guides selectively to the work position and the rest position.

In certain embodiments of the present disclosure, the bridge comprises runners configured to run along the guides and support the reel. The runners serve to reduce friction as the reel moves along the guides.

In certain embodiments, each runner has an actuator configured to raise the top of the runner and reel. This way, the reel can be raised without suspending reel from a crane.

In certain embodiments, the bridge is mounted on the auxiliary structure to avoid encumbering the laying vessel.

In certain embodiments, the laying vessel comprises a support assembly configured to support the bridge, and which defines a predetermined bridge supporting point on the laying vessel.

In certain embodiments, the support assembly comprises at least one heave compensating device to reduce oscillation of the bridge when transferring the reels.

In one variation, the support assembly comprises rigid supports, which define a bridge supporting point along the longitudinal plane of symmetry of the laying vessel, to minimize listing of the laying vessel caused by the bridge and reel.

In certain embodiments, the laying vessel comprises at least one unreeling device configured to support the reel for rotation.

In certain embodiments, the laying vessel comprises an elevator configured to lift/release the reel off/onto the bridge and position the reel at the unreeling device.

The elevator is also configured to be positioned under the reel, to lift the reel off the bridge. In other words, the reel and the elevator are configured to provide relatively highly stable support of the reel on the elevator.

In certain embodiments, the laying vessel has a main deck; at least one unreeling station; and a pit in the main deck, at the unreeling station; the pit being configured to at least partly house an elevator and the reel. The pit provides for housing the elevator beneath the bridge and, therefore, beneath the reel at the unreeling station, thus lowering the barycentre of the laying vessel.

In certain embodiments, the reel has an axis of rotation, and is moved along the bridge in a direction parallel to the axis of rotation. This configuration is particularly stable by preventing the reel from rolling.

In certain embodiments of the present disclosure, the reel comprises two grip points along the axis of rotation, so the reel can be supported for rotation to wind and unwind reel.

In certain embodiments, the reel comprises two facing retaining shoulders configured to rest on a support.

In addition to laterally retaining the string wound on the reel, the retaining shoulders also serve to support the entire reel, and possibly the relative string, when the retaining shoulders are positioned resting on a support.

More specifically, the outer edge of each retaining shoulder has two first supporting points, in particular recesses, configured to rest on the bridge.

The first supporting points make the position of the reel on the bridge more stable by interrupting the circular shape of the outer edge.

In certain embodiments, the outer edge of each retaining shoulder of the reel has two second supporting points, in particular recesses, configured to rest on a trolley or elevator.

It should be appreciated that the reel has a number or quantity of stable supporting points along the outer edges of the retaining shoulders. This configuration of the reel enables reels to be positioned simultaneously on two supports, and makes the reel relatively easier to transfer from one support to the other.

In certain embodiments, the auxiliary structure has a reeling station configured to wind a string onto a reel. Auxiliary work is, in certain embodiments, carried out on the auxiliary structure. For this reason, in certain embodiments, the auxiliary structure comprises at least one string assembly line, and the reeling station is aligned with the assembly line.

In certain embodiments of the present disclosure, the auxiliary structure has a trolley movable between the reeling station and the transfer station.

This transfer is also made using a trolley on which the reel rests.

The trolley is, in certain embodiments, configured for location underneath the bridge at the transfer station, and to position part of the reel above the bridge.

In other words, at the transfer station, the trolley is set to a predetermined position, in which the first supporting points are located above the guides, in particular above the runners, so that raising the runners lifts the reel off the trolley, which can then be withdrawn from the transfer station. Once the trolley is withdrawn, the runners can be lowered. In other words, transfer between the trolley and the bridge can be made with relatively very small movements.

In certain embodiments of the present disclosure, the auxiliary structure is a floating auxiliary structure, such as a barge, which houses a workshop configured to prefabricate and wind the strings onto the reels. This way, the workshop can be transferred to attend the laying vessel in different, convenient areas, to optimize travel of the laying vessel, and with no need to repeatedly equip prefabrication shops along the quays.

The present disclosure also relates to a method of handling reels configured to lay elongated members on the bed of a body of water.

The aim of the disclosure is to provide a reel handling method configured to eliminate or at least reduce certain of the drawbacks of certain of the known art.

According to the present disclosure, there is provided a method of handling reels configured to lay elongated members on the bed of a body of water, the method comprising the steps of placing a bridge comprising two rails between a transfer station of an auxiliary structure and an unreeling station of a laying vessel; and moving the at least one reel along the bridge between the auxiliary structure and the laying vessel, wherein the guides are movable between a rest position a work position, in which they are parallel to each other, with a designated or given gauge, to define the bridge, which extends from transfer station to unreeling station where reels are loaded/unloaded onto/off bridge; the reel being configured to rest on the bridge.

By virtue of the method according to the present disclosure, the reel can be transferred from the auxiliary structure to the laying vessel without being suspended from a crane.

In certain embodiments of the present disclosure, the method comprises lifting/lowering the reel utilizing a trolley positioned under the reel. The reel need only be lifted or lowered slightly to modify the supporting configuration and transfer the load from one support to another.

The reel can be lifted/lowered slightly utilizing runners under the reel. The runners are, in certain embodiments, associated with actuators configured to lift the reel.

To lift/lower the reel several meters, an elevator is used under the reel. For example, at the unreeling station, the elevator is capable of travelling several meters to set the reel in the unreeling position and to load/unload the reel onto/off the bridge.

Lifting/lowering the reel using lifting devices under the reel is one characteristic of the system according to the present disclosure.

The reel is transferred from one support to another by engaging the reel simultaneously with both supports for a short length of time, and then disengaging the releasing support.

By virtue of the present disclosure, the laying vessel is also capable of handling the reels with no need for a crane.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which:

FIG. 1 shows a plan view, with parts removed for clarity, of a reel handling system in accordance with the present disclosure and in a work configuration;

FIG. 2 shows a side view of a reel with parts removed for clarity;

FIG. 3 shows a partly sectioned elevation, with parts removed for clarity, of the FIG. 2 reel;

FIG. 5 shows a partly sectioned elevation, with parts removed for clarity, of a detail of a reel transfer stage using the handling system according to the present disclosure;

FIG. 6 shows a partly sectioned elevation, with parts removed for clarity, of another stage in transferring the FIG. 5 reel;

FIG. 8 shows a view in perspective, with parts removed for clarity, of the FIG. 1 system in a rest configuration;

FIG. 9 shows an elevation, with parts removed for clarity, of a detail in FIG. 1;

FIG. 10 shows a section, with parts removed for clarity, of the FIG. 9 detail along line X-X;

FIG. 16 shows a cross section, with parts removed for clarity, of a variation of the present disclosure;

FIG. 17 shows a longitudinal section, with parts removed for clarity, of the FIG. 16 variation;

FIG. 18 shows a plan view, with parts removed for clarity, of a further variation of the present disclosure.

DETAILED DESCRIPTION

Figure 4:
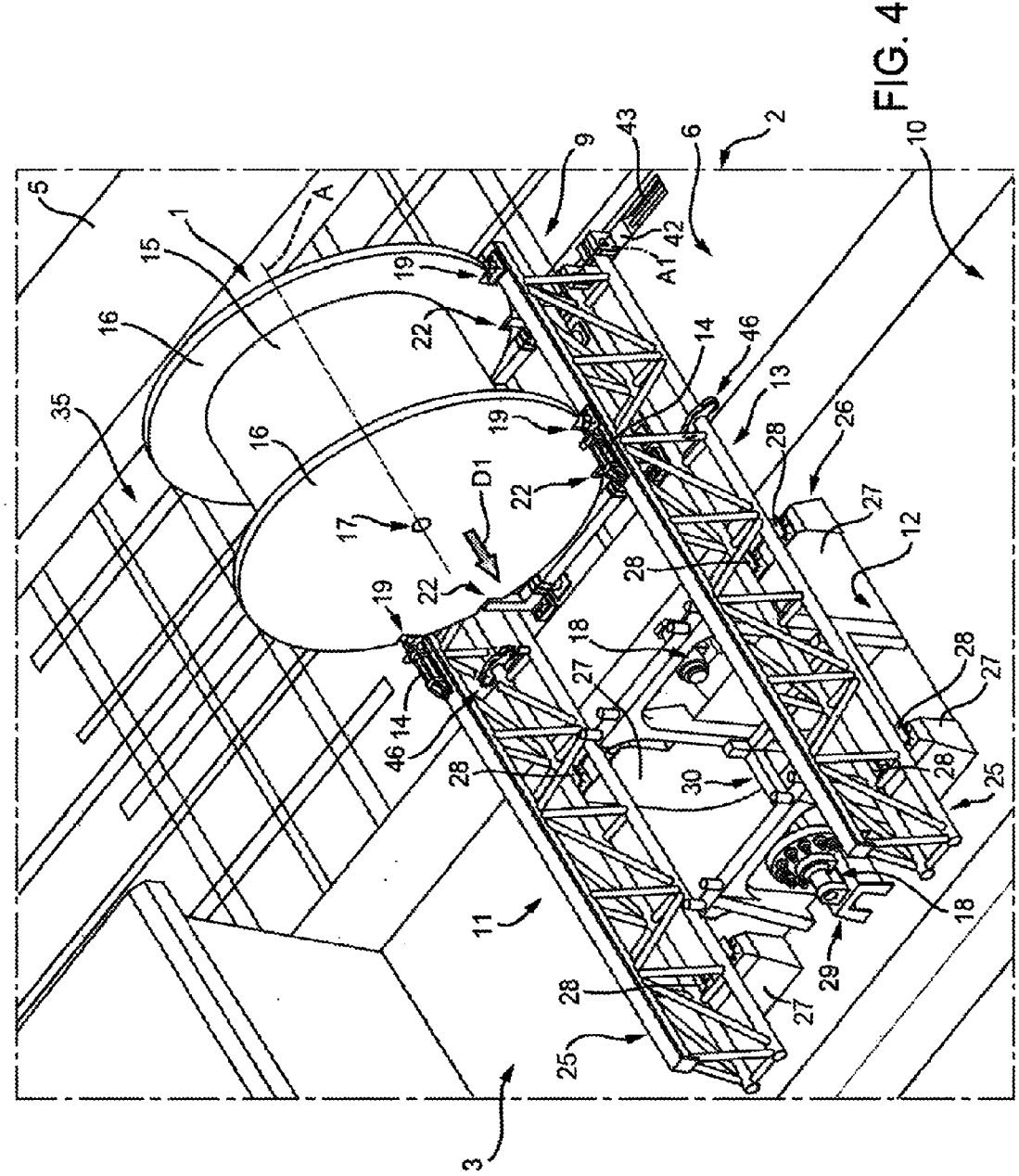
FIG. 4 shows a view in perspective, with parts removed for clarity, of a detail of the FIG. 1 handling system in a further work configuration.

Referring now to the example embodiments of the present disclosure illustrated in FIGS. 1 to 19, FIG. 1 shows as a whole a system configured to handle reels 1, and in particular configured to transfer reels 1 between an auxiliary structure 2 and a laying vessel 3. More specifically, the system according to the disclosure is configured to transfer reels 1, wound with strings 4 configured to form an underwater pipeline (not shown in the drawings), from auxiliary structure 2 to laying vessel 3, and to transfer unwound reels 1 from laying vessel 3 to auxiliary structure 2. Reference number 1 indicates both wound and fully or partly unwound reels.

In the FIG. 1 layout, auxiliary structure 2 is a floating auxiliary structure, such as a barge equipped with bumpers, and drawn up alongside a quay 5 on one side, and alongside laying vessel 3 on the other.

Auxiliary structure 2 has a platform 6 supporting a reeling station 7 configured to wind strings 4 onto reels 1; an assembly line 8 configured to assemble strings 4 or portions of strings 4; and a transfer station 9 configured to load and unload reels 1. Auxiliary structure 2 also comprises paths extending along platform 6 to connect reeling station 7, transfer station 9 and storage areas.

Laying vessel 3 has a main deck 10; an unreeling station 11 where strings 4 are unwound off reels 1; and a pit 12 located at unreeling station 11. Pit 12 is in the form of a recess (i.e., a hold), formed in main deck 10.

The system comprises a bridge 13 configured to connect auxiliary structure 2 and laying vessel 3; and actuators 14 configured to move reel 1 along bridge 13.

Bridge 13 and reels 1 are configured so that one reel 1 at a time can be supported stably on bridge 13.

In the work position, bridge 13 extends partly over platform 6 and partly over main deck 10 of laying vessel 3.

More specifically, in the work position, bridge 13 extends from transfer station 9 to unreeling station 11, which are also the stations where reels 1 are loaded/unloaded onto/off bridge 13.

Each reel 1 has an axis of rotation A, and is configured to be moved along bridge 13 in a direction D1 parallel to axis of rotation A.

In a variation (not shown), the reel and bridge are configured to position the reel on the bridge with its axis of rotation crosswise to the guides, and to move the reel along the guides in a direction parallel to the guides and perpendicular to the axis of rotation of the reel.

It should be appreciated that in the handling system according to the present disclosure, each reel 1 is transferred without having to be suspended from a crane. That is, reel 1 is supported at all times.

It should be further appreciated that reel 1 is part of the handling system, and is configured to cooperate with various component parts of the system to rest on various types of supports with which the system is equipped.

With reference to FIGS. 2 and 3, each reel 1 comprises a drum 15; and two facing retaining shoulders 16 on opposite sides of drum 15.

Each reel 1 is substantially defined by a cylindrical body extending about axis of rotation A. Strings 4 (FIG. 1) are wound onto drum 15, and are retained by retaining shoulders 16. In the present disclosure, retaining shoulders 16 also serve to support the entire reel 1 and relative string (FIG. 1) when the reel is positioned resting on a support by the retaining shoulders. Consequently, retaining shoulders 16 are configured for this function.

With reference to FIG. 3, each reel 1 comprises two grip points 17 aligned along axis of rotation A. Each grip point 17 comprises an axial hole engaged by a gripper 18 comprising a shaft. When grip points 17 are engaged by both grippers 18, reel 1 can be rotated about axis of rotation A by the shafts, or by at least one of the shafts, of grippers 18.

With reference to FIG. 2, each reel 1 has four supporting points 19, only two of which are shown in FIG. 2. The outer edge of each retaining shoulder 16 has two supporting points 19. Each supporting point 19 is substantially defined by a recess formed along the outer edge of retaining shoulder 16. The four supporting points 19 have respective coplanar supporting faces 20; and respective retaining faces 21 coplanar in pairs.

Each reel 1 has four supporting points 22, only two of which are shown in FIG. 2. The outer edge of each retaining shoulder 16 has two supporting points 22 located between the two supporting points 19. Each supporting point 22 is substantially defined by a recess formed in the outer edge of retaining shoulder 16. The four supporting points 22 have respective coplanar supporting faces 23; and respective retaining faces 24 coplanar in pairs.

At reeling station 7 and unreeling station 11 (FIG. 1), reel 1 is supported at grip points 17.

On bridge 13 (FIG. 1), each reel 1 is positioned resting on supporting points 19.

Each reel 1 is positioned resting on supporting points 22 as reel is transferred from reeling station 7 to transfer station 9, and as reel is transferred to unreeling station 11 on board laying vessel 3.

FIG. 4 shows bridge 13 in the work position, and an empty reel 1 resting on bridge 13 at transfer station 9.

More specifically, bridge 13 comprises two guides 25 which, in the work position, are parallel to each other, with a designated or given gauge, and substantially horizontal. Each guide 25 is hinged to platform 6 about an axis A1 perpendicular to guide 25, and can be rotated selectively about axis A1.

More specifically, each guide 25 is movable independently of the other.

Laying vessel 3 comprises a support assembly 26 configured to support bridge 13. More specifically, support assembly 26 is movable with respect to main deck 10 to compensate for wave motion and reduce any oscillation of bridge 13 induced by laying vessel 3. In the example shown, support assembly 26 comprises four controlled-yield compensating devices 27 located partly inside pit 12 and comprising plates 28 projecting above main deck 10. Each guide 25 rests on two plates 28.

Unreeling station 11 has an unreeling device 29 configured to grip reel 1 at grip points 17. An elevator 30 is housed inside pit 12, substantially at unreeling station 11, to unload reel 1 off bridge 13, load real 1 onto bridge 13, and position reel 1 at unreeling device 29.

As shown more clearly in FIGS. 5 and 6, unreeling device 29 comprises two slides 31 mounted to slide with respect to main deck 10 in a direction D1, and two grippers 18 mounted on slides 31. In the present document, the term 'direction' is used in the sense of 'path', regardless of the actual direction. A direction indicated in the drawings is intended purely by way of example, and does not exclude the possibility of movement in the opposite direction to the one shown in the drawings.

Unreeling device 29 comprises actuators (not shown in the attached drawings), configured to move slides 31 and respective grippers 18 towards and away from each other in two-way direction D1, and to rotate at least one of grippers 18. To transfer reel 1 from bridge 13 to unreeling device 29, bridge 13 extends over pit 12, in which elevator 30 is housed, and over unreeling device 29.

With reference to FIG. 5, elevator 30 comprises two uprights 32 fitted in sliding manner to the lateral walls of pit 12; and a frame 33 connected to uprights 32 and configured to engage a reel 1 resting on bridge 13 at unreeling station 11. In other words, when raising elevator 30, frame 33 engages reel 1 at supporting points 22, and raises reel 1 with respect to bridge 13.

At this point, bridge 13 is withdrawn, and elevator 30 is lowered inside pit 12 to align the axis of rotation A of reel 1 with grippers 18, which are activated to engage grip points 17 of reel 1, as shown in FIG. 6. Once reel 1 is engaged by grippers 18, elevator 30 is lowered further to release frame 33 from supporting points 22 of reel 1 and permit rotation of reel 1.

Figure 7:
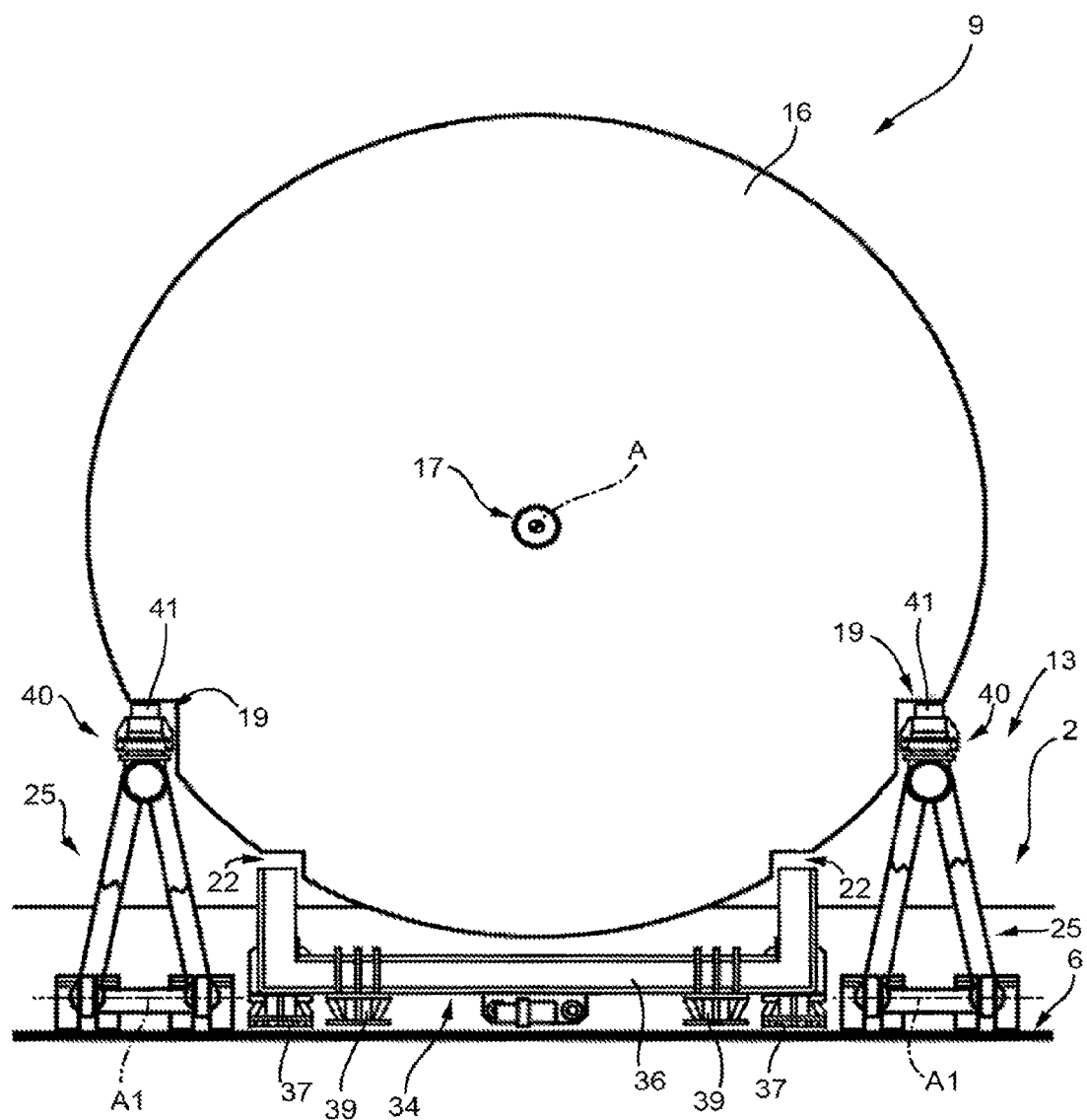
FIG. 7 shows a larger-scale elevation, with parts removed for clarity, of a detail of the FIG. 4 system.

With reference to FIG. 7, reels 1 are transported along platform 6 of auxiliary structure 2 using trolleys 34. Each trolley 34 is configured to transport one reel 1 and to travel along paths laid out on platform 6. In the example shown, the paths are defined by a grid of rails 35 (FIG. 1). And each trolley 34 is configured to engage and travel along two rails 35.

Each trolley 34 comprises a frame 36 configured to support reel 1 at supporting points 22.

Trolley 34 comprises runners 37 fitted to rails 35, and cooperates with actuators 38 (FIG. 11) configured to move along rails 35 and to engage and draw along trolley 34. In certain embodiments, actuators 38 comprise hydraulic jacks.

Trolley 34 is sized to fit between guides 25 and to transfer reel 1 from trolley 34 to bridge 13 and vice versa.

Trolley 34 is capable of slight lifting movements utilizing actuators 39.

Bridge 13 also comprises runners 40 fitted to and which run along guides 25. In certain embodiments, runners 40 are known types, such as a Hilman rolling platform. In addition, each runner 40 comprises an actuator 41 configured to raise the top of runner 40 with respect to guide 25. In other words, reel 1 resting on bridge 13 is positioned resting on four runners 40 configured to run along guides 25. On entering transfer station 9 with reel 1, trolley 34 positions supporting points 19 on runners 40. By slightly raising runners 40, reel 1 can be lifted off trolley 34 and transferred from trolley 34 to bridge 13. At this point, trolley 34 can be withdrawn from transfer station 9, and reel 1 lowered.

With reference to FIG. 4, actuators 14 are configured to draw or push runners 40 and therefore reel 1 along bridge 13. In certain embodiments, actuators 14 also comprise hydraulic jacks engaging guides 25, and may also serve as a parking brake to hold runners 40 and reel 1 in a designated or given position.

FIG. 8 shows bridge 13 in a rest configuration, in which guides 25 are perpendicular to platform 6. More specifically, bridge 13 comprises actuators, (not shown), configured to rotate guides 25 about axes A1 from the FIG. 4 work configuration to the rest configuration, and vice versa. Moving from the work to the rest configuration by simply rotating guides 25 about axes A1, however, is only possible when unreeling station 11 is free of reel 1. That is, each reel 1 is larger in diameter than the gauge of guides 25, which is necessarily 'reduced' to provide adequate support for reel 1 resting on guides 25. As shown in FIG. 8, each guide 25 is mounted on a slide 42, which is fitted to platform 6 to slide in a direction perpendicular to guide 25. This way, the gauge of guides 25 can be adjusted utilizing an actuator 43.

With reference to FIGS. 8 to 10, each guide 25 is defined by a trellis structure 44 with a rail 45 on top. Trellis structure 44 is hinged at one end to slide 42 about axis A1, and has wheels 46 by which to roll along platform 6. Wheels 46 serve to reduce friction when altering the gauge of guides 25 resting on platform 6.

Figure 11:
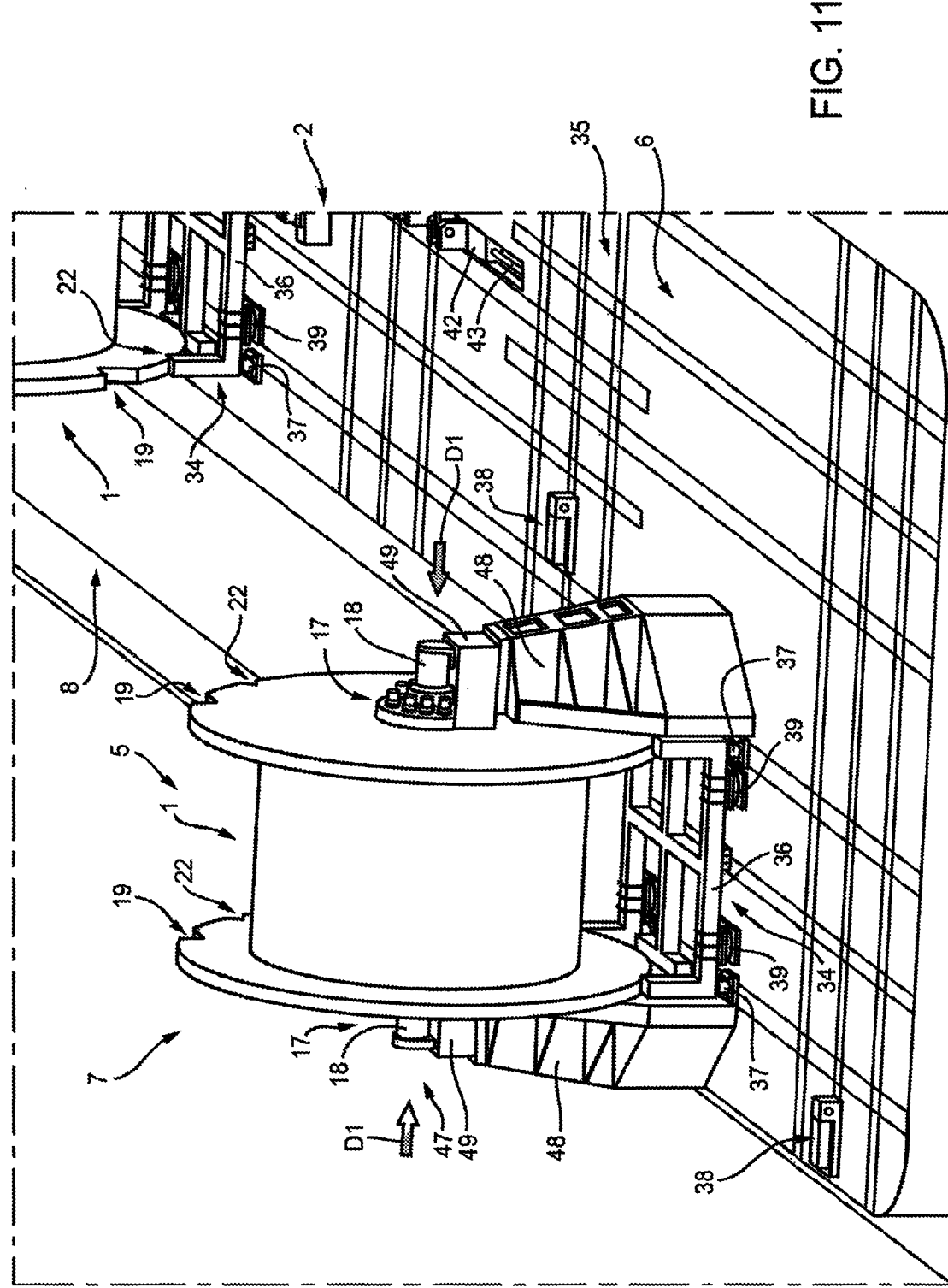
FIG. 11 shows a view in perspective, with parts removed for clarity, of a detail of the FIG. 1 handling system.

With reference to FIG. 11, at reeling station 7, auxiliary structure 2 comprises a reeling device 47, which in turn comprises two uprights 48 fixed to platform 6, two slides 49 fitted to the top of and movable in direction D1 with respect to respective uprights 48, and two grippers 18 fitted to slides 49. To transfer a reel 1 from a trolley 34 to reeling device 47, trolley 34 is inserted between uprights 48; reel 1 is gripped by grippers 18; and trolley 34 is lowered to permit rotation of reel 1. Trolley 34 remains underneath reel 1 the whole time reel is being wound. When winding of the reel is completed, trolley 34 is raised to support the weight of reel 1, and grippers 18 and respective slides 49 are parted to release grippers 18 from reel 1. Trolley 34 and reel 1 are now free to be removed from winding station 7 and drawn by actuators 38 along rails 35 to a holding/storage area.

With reference to FIG. 1, to load a wound reel 1 into a vacant unreeling station 11 on laying vessel 3, laying vessel 3 is drawn up alongside auxiliary structure 2, and bridge 13 is laid between auxiliary structure 2 and laying vessel 3. At this point, trolley 34 and the wound reel 1 are moved into transfer station 9. As shown in FIG. 7, the wound reel 1 is transferred from trolley 34 to bridge 13 by raising runners 40.

Once transferred to bridge 13, the wound reel 1 is moved in direction D1 into a position over pit 12 at unreeling station 11.

As shown in FIG. 5, elevator 30 lifts reel 1 off bridge 13.

Guides 25 are parted to increase the gauge, and are rotated into a vertical position as shown in FIG. 8.

Next, elevator 30 lowers reel 1 to set reel, at least partly, into a position in which reel can be gripped by grippers 18. Once reel 1 is gripped by unreeling device 29, elevator 30 is lowered further to clear reel 1 as reel is being unreeled.

Figure 12:
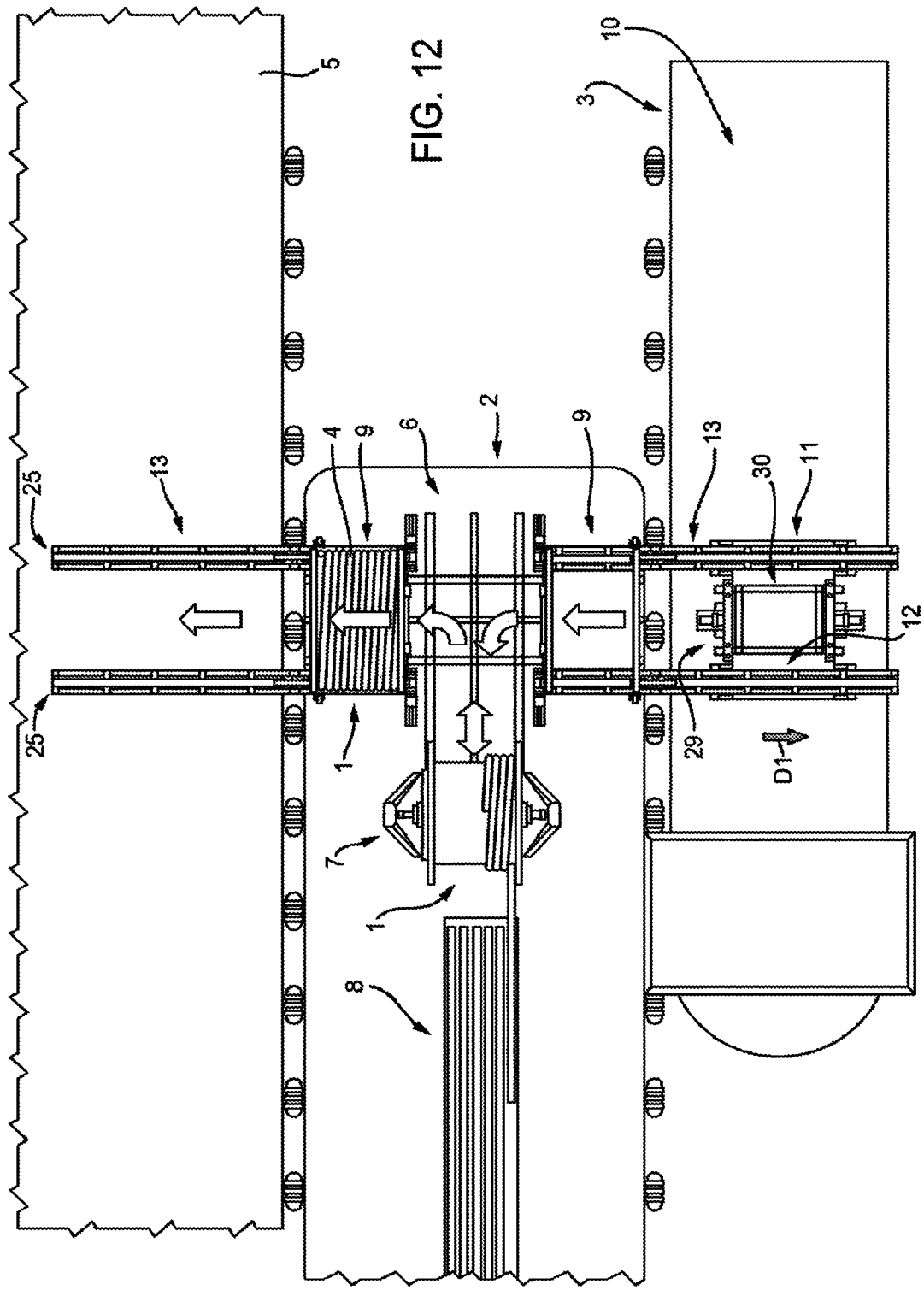
FIG. 12 shows a plan view, with parts removed for clarity, of the system according to the present disclosure and with an alternative layout to that in FIG. 1.

In the FIG. 12 variation, the handling system comprises two bridges 13, one connecting auxiliary structure 2 to laying vessel 3, and the other connecting auxiliary structure 2 to quay 5.

Figure 13:
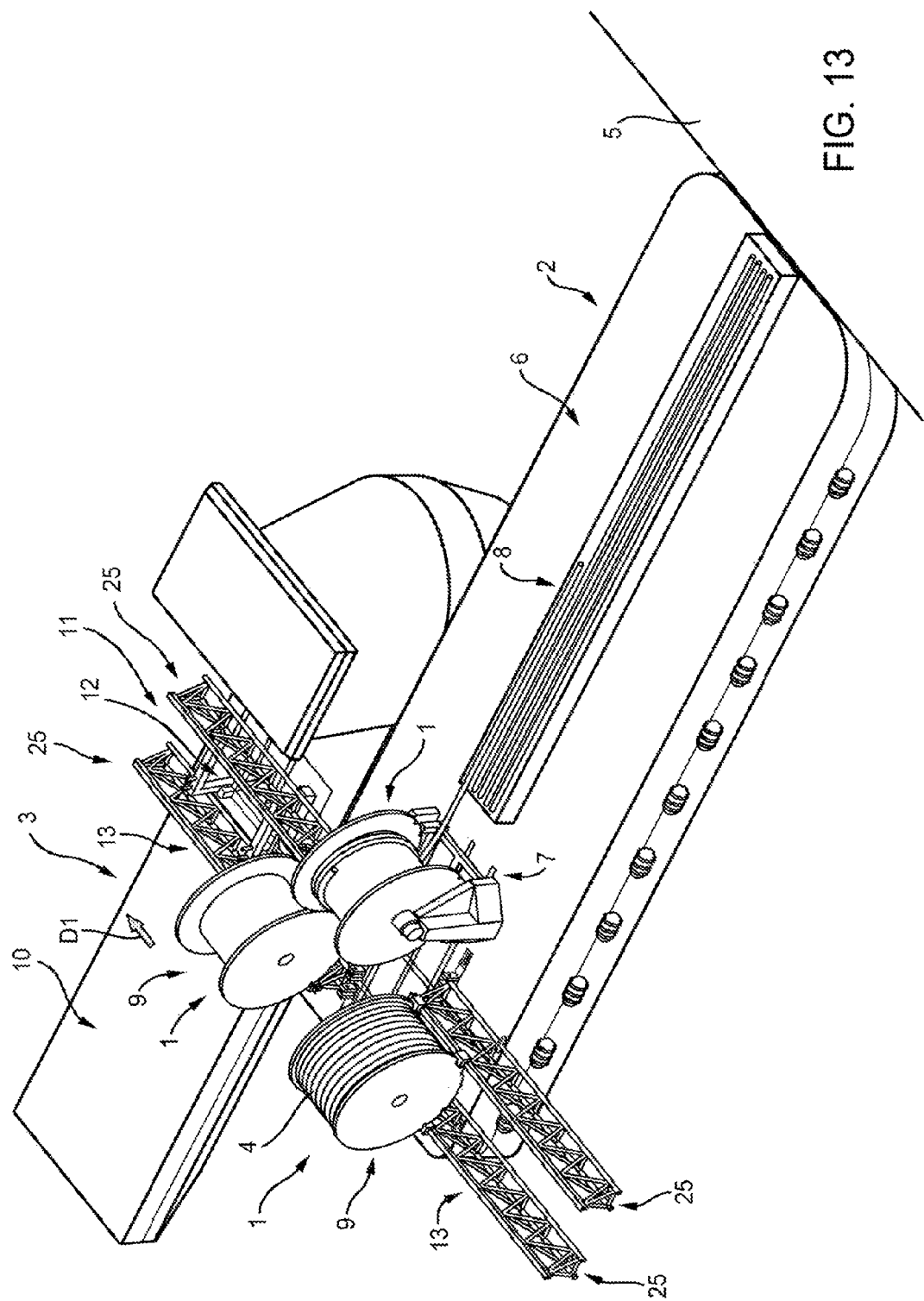
FIG. 13 shows a view in perspective, with parts removed for clarity, of a further layout of the system according to the present disclosure.

In the FIG. 13 variation, auxiliary structure 2 is positioned endwise with respect to quay 5, and has two bridges 13 projecting from opposite edges of auxiliary structure 2 to serve two laying vessels 3 at the same time.

Figure 14:
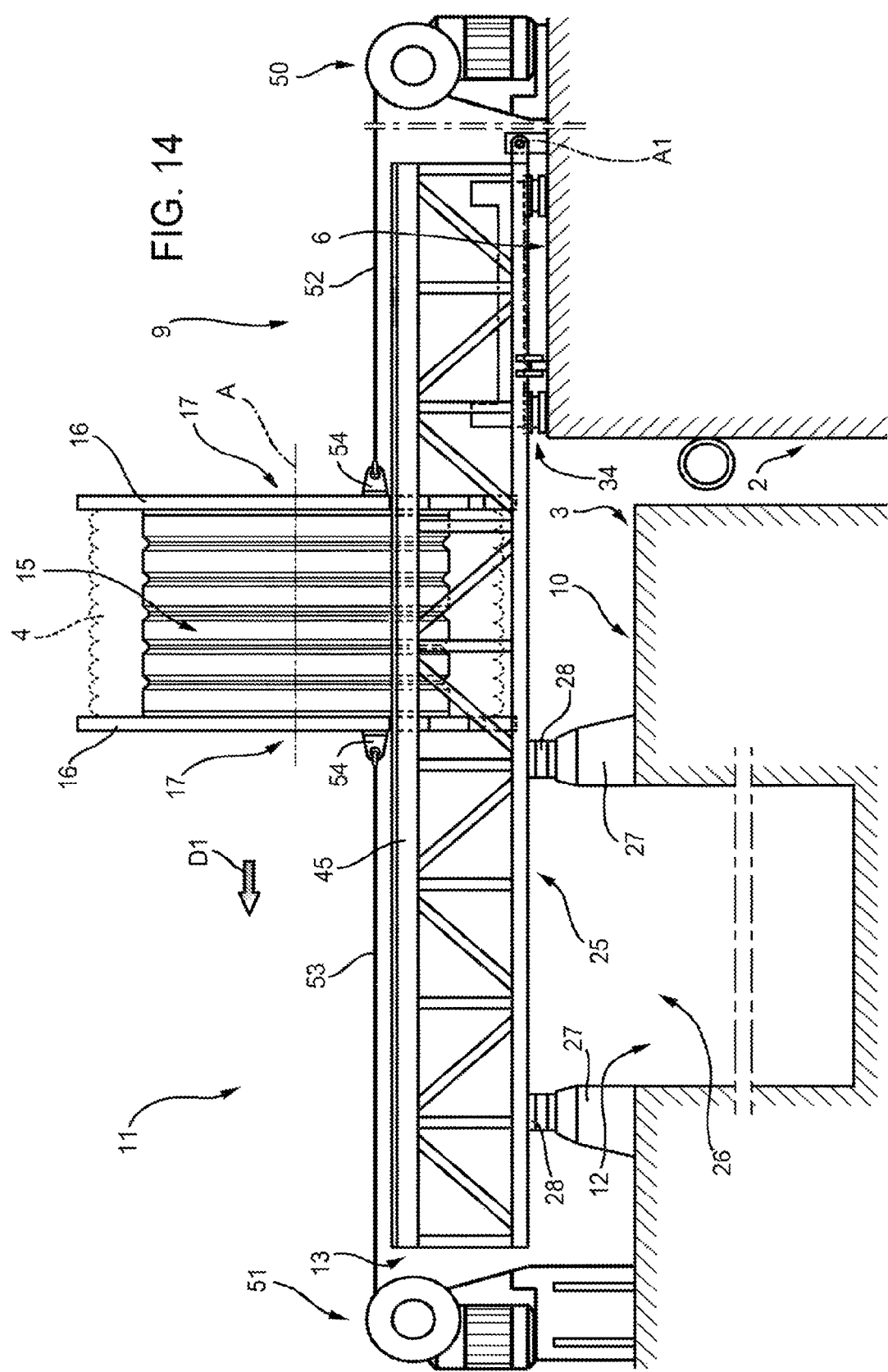
FIG. 14 shows a partly sectioned elevation, with parts removed for clarity, of an alternative embodiment of the handling system according to the present disclosure.

In the FIG. 14 embodiment, bridge 13 is simplified with respect to the embodiment in the preceding drawings. In this embodiment, runners 40 (FIGS. 4 and 7) are omitted, and reel 1 slides along guides 25 of bridge 13. To reduce friction between reel 1 and guides 25, guides 25 are greased, or Teflon panels are interposed between reel 1 and guides 25.

In the FIG. 14 embodiment, actuators 14 (FIG. 4) are also replaced with an actuator 50 on auxiliary structure 2, and an actuator 51 on laying vessel 3. In the example shown, actuators 50 and 51 are two winches comprising respective cables 52 and 53 connectable to reel 1. And reel 1 has two eyelets 54 fitted to the outer faces of respective retaining shoulders 16.

To supply a wound reel 1 to unreeling station 11, actuator 51 hauls reel 1 along guides 25 utilizing cable 53.

Conversely, to remove an unwound reel 1 from unreeling station 11, reel 1 is connected to cable 52.

In FIG. 14, reel 1 is connected to both cables 52 and 53, to illustrate both supply and removal of reel 1 in one drawing.

Eliminating runners 40 (FIGS. 4 and 7), which in the preceding embodiment also served to lift reel 1, makes it necessary to alter the way in which reels 1 are transferred between bridge 13 and trolley 34.

Figure 15:
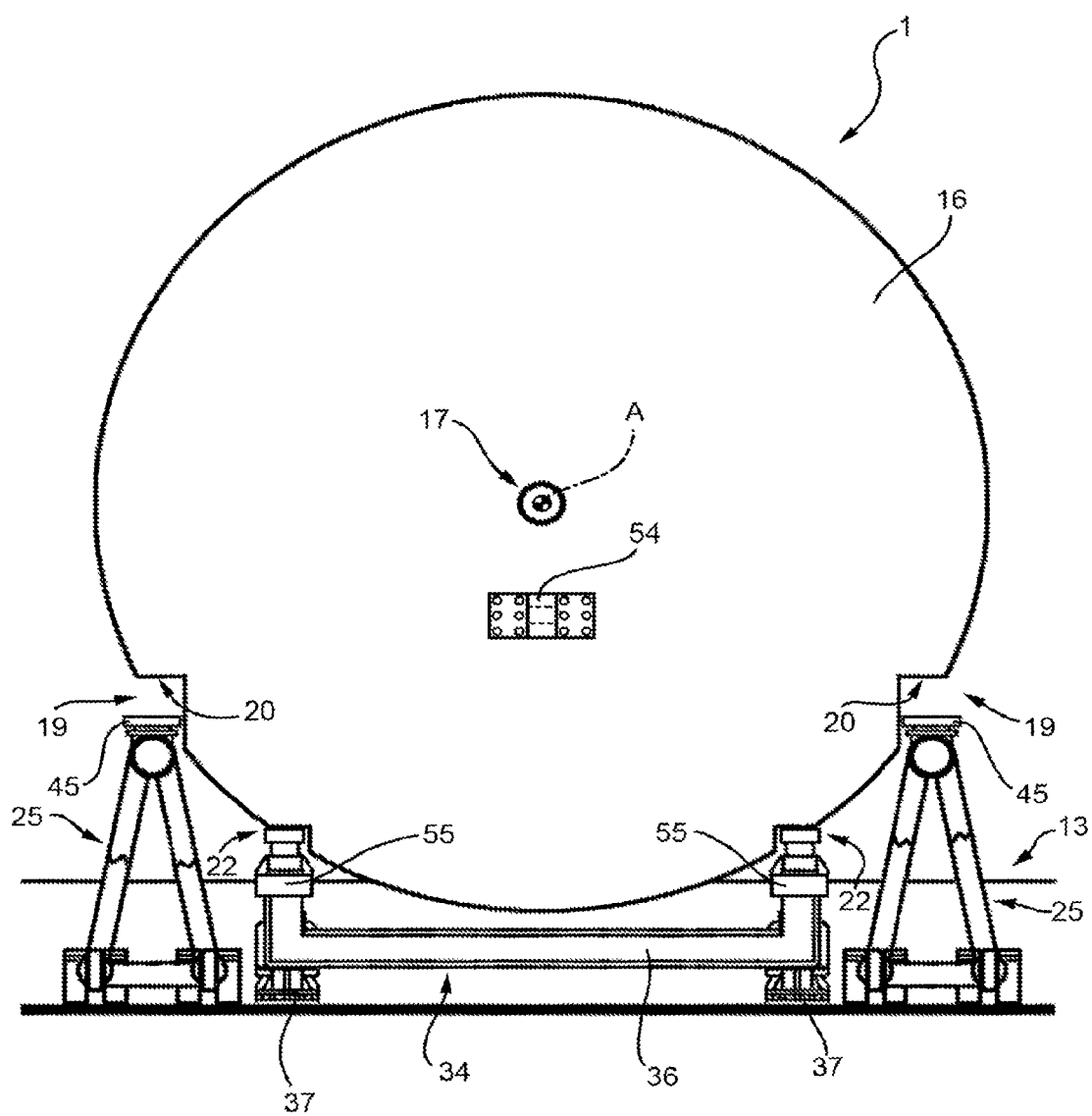
FIG. 15 shows a partly sectioned elevation, with parts removed for clarity, of a detail of the alternative embodiment in FIG. 14.

In FIG. 15, reel 1 rests on a trolley 34 comprising actuators 55 configured to selectively lift and lower reel 1. Trolley 34 engages reel 1 at supporting points 22, and is configured to lift reel 1 to position supporting points 19 over guides 25, and to lower faces 20 of supporting points 19 below the top surface of guides 25 when the trolley disengages guides 25.

More specifically, trolley 34 has four actuators 55 configured to engage supporting points 22.

When a reel 1 resting on a trolley 34 is positioned facing bridge 13, reel 1 is raised to enable trolley 34 to move between guides 25 into the transfer station, with supporting points 19 positioned over guides 25. Next, reel 1 is lowered onto guides 25. And trolley 34 at this point can be withdrawn from transfer station 9.

In the FIGS. 16 and 17 variation, the compensating device is omitted, and bridge 13 is supported by a support assembly 26 comprising two supports 56. Each guide 25 of bridge 13 is supported on a supporting point 57 of a respective support 56. Supporting point 57 is located along the longitudinal plane of symmetry P of laying vessel 3. In other words, each guide 25 simply rests on a respective support 56, and is free to oscillate and/or slide with respect to supporting point 57. The location of supporting point 57 along longitudinal plane of symmetry P reduces listing of laying vessel 3 induced by bridge 13 and reel 1.

As shown in FIG. 17, supports 56 are, in certain embodiments, located inside pit 12, and are movable between a work position (shown by the continuous line), and a rest position (shown by the dash line), in which supports 56 enable reel 1 to be inserted freely inside pit 12.

In the FIG. 18 variation, bridge 13 is movable in direction D1 between a work position and a rest position, the latter (not shown in FIG. 18). Each guide 25 is mounted on a block 58 fitted slidably to auxiliary structure 2, and which has an actuator configured to move guide 25 both ways in direction D1. In other words, each block 58 is connected slidably to a respective guide 25 on platform 6.

Figure 19:
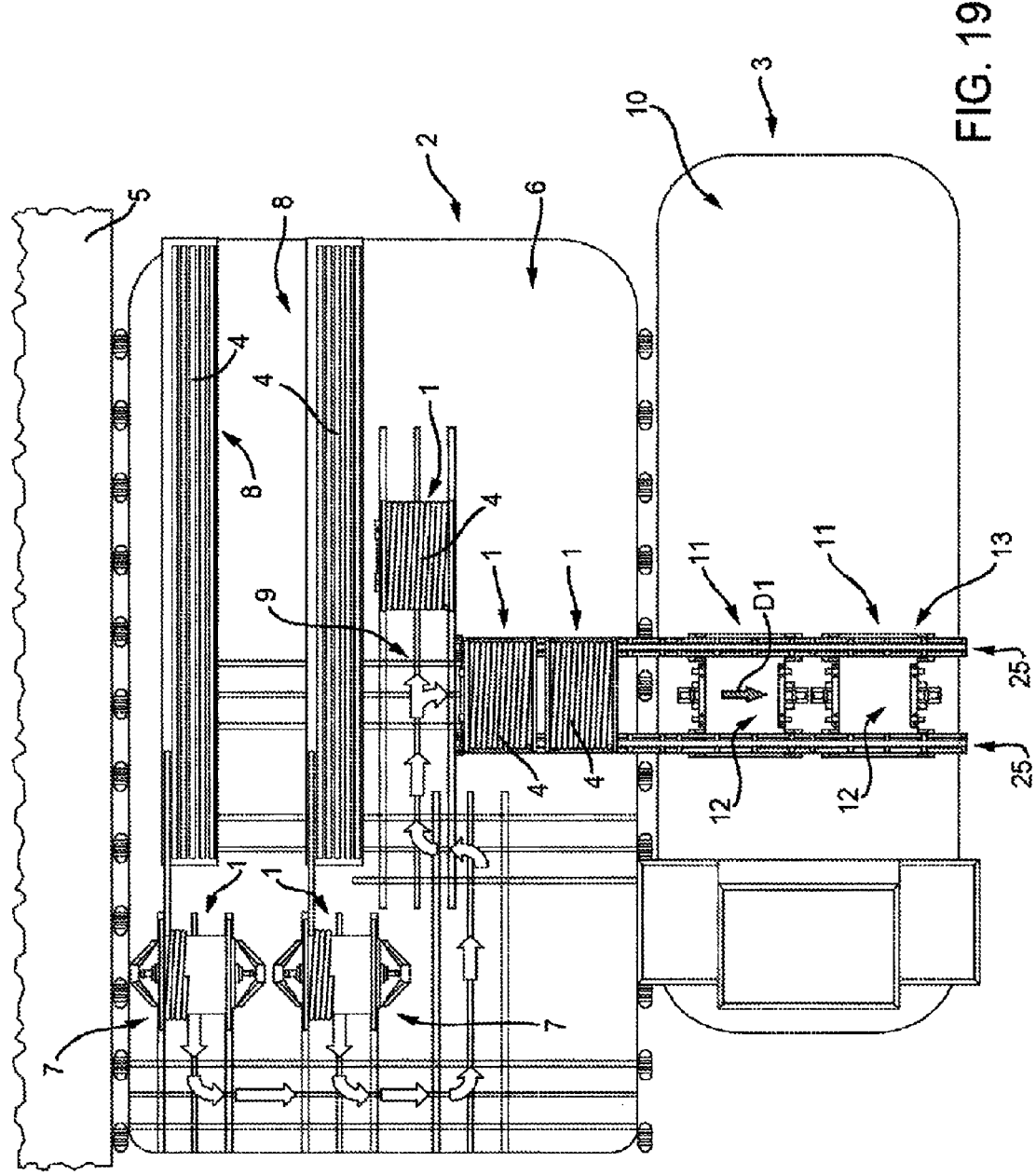
FIG. 19 shows a plan view, with parts removed for clarity, of a reel handling system in accordance with an alternative embodiment of the present disclosure.

In the FIG. 19 embodiment, auxiliary structure 2 houses two reeling stations 7 and two assembly lines 8 parallel to each other.

Transfer station 9 is also, in certain embodiments, double, and provides for loading/unloading two reels 1 onto/off bridge 13 even simultaneously.

In the FIG. 19 embodiment, laying vessel 3 comprises two unreeling stations 11. More specifically, unreeling stations 11 are aligned in direction D1, so they can be served by one bridge 13.

Bridge 13 in FIG. 19 is longer than the ones described previously, since bridge has to define a double transfer station 9 along platform 6 and cater to two unreeling stations 11.

Clearly, other changes, not described herein, can be made to the present disclosure without, however, departing from the protective scope of the accompanying Claims. For example, auxiliary structure 2 may comprise one reeling station and two transfer stations, or two reeling stations and one transfer station. Similarly, the auxiliary structure may cater to a laying vessel with one or a number or quantity of unreeling stations. A single transfer station may be supplied in rapid succession with two reels fed along the bridge. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laying vessel configured to lay an elongated member unwound off of a reel, the laying vessel comprising:
   a main deck;
   an unreeling station along the main deck, said unreeling station including an unreeling device configured to support the reel for rotation;
   a pit defined by a recess formed in the main deck, said pit including a plurality of lateral walls beneath the unreeling station; and
   an elevator housed in the pit and configured to lift and lower the reel, said elevator including a first upright slideably fitted to a first of the lateral walls of the pit and a second upright slideably fitted to a second of the lateral walls of the pit.

2. A laying vessel configured to lay an elongated member unwound off of a reel, the laying vessel comprising:
   a main deck;
   an unreeling station along the main deck, said unreeling station including an unreeling device configured to support the reel for rotation;
   a support assembly configured to support a bridge configured to transfer the reel and position the reel at the unreeling device;
   a pit defined by the main deck, said pit being beneath the unreeling station;
   an elevator housed in the pit and configured to lift the reel onto the bridge and lower the reel to release the reel off of the bridge.

3. The laying vessel of claim 2, wherein the support assembly includes at least one heave compensating device.

4. The laying vessel of claim 2, wherein the support assembly includes two supports each including a supporting point for the bridge, the supporting point being located along a longitudinal plane of symmetry of the laying vessel.

* * * * *